United States Patent [19]
Noritsugu et al.

[11] Patent Number: 5,296,170
[45] Date of Patent: Mar. 22, 1994

[54] METHOD FOR IMPROVING THE INTERNAL SURFACE OF SEAMLESS TUBE OF MULTI-LAYER PLASTICS FILM LAMINATE

[75] Inventors: Noritsugu Sugimoto, Zama; Mori Nobuyuki, Hatano; Shoji Nakamura, Yasu; Fusazo Wada, Moriyama, all of Japan

[73] Assignees: Gunze Ltd., Kyoto; Gunze Kobunshi Corporation, Isehara, both of Japan

[21] Appl. No.: 543,833
[22] PCT Filed: Nov. 16, 1989
[86] PCT No.: PCT/JP89/01170
   § 371 Date: Jul. 13, 1990
   § 102(e) Date: Jul. 13, 1990
[87] PCT Pub. No.: WO90/05757
   PCT Pub. Date: May 31, 1990

[30] Foreign Application Priority Data

Nov. 17, 1988 [JP] Japan ................. 63-292021
Nov. 29, 1988 [JP] Japan ................. 63-303421

[51] Int. Cl.⁵ .................. B29C 71/04; B29C 59/10
[52] U.S. Cl. ............................... 264/22; 204/165; 264/510; 264/566; 264/570; 264/173; 264/DIG. 50; 425/174.8 E; 425/DIG. 2; 427/458; 427/540; 428/34.9; 428/475.8
[58] Field of Search ............... 264/22, 563, 566, 570, 264/510, 173, DIG. 50, 83; 156/272.6; 204/164, 165, 168; 428/34.9, 576, 475.8; 427/458, 540; 425/174, DIG. 2, 174.8 E

[56] References Cited

U.S. PATENT DOCUMENTS

| | | | |
|---|---|---|---|
| 3,66,735 | 5/1972 | Drelich | 204/165 |
| 4,096,013 | 6/1978 | Lutzmann et al. | 156/272.6 |
| 4,411,919 | 10/1983 | Thompson | |
| 4,442,158 | 4/1984 | Distler | 264/22 |
| 4,854,999 | 8/1989 | Schirmer | 156/272.6 |
| 4,861,526 | 8/1989 | Gibbons et al. | 264/22 |
| 4,888,223 | 12/1989 | Sugimoto et al. | 264/22 |
| 4,940,521 | 7/1990 | Dinter et al. | 204/165 |

FOREIGN PATENT DOCUMENTS

| | | | |
|---|---|---|---|
| 3637433 | 3/1988 | Fed. Rep. of Germany | 264/22 |
| 54-76674 | 6/1979 | Japan | |
| 54-142283 | 11/1979 | Japan | |
| 54-142284 | 11/1979 | Japan | |
| 55-6503 | 2/1980 | Japan | 156/272.6 |
| 2009033 | 6/1979 | United Kingdom | |

Primary Examiner—Jeffery Thurlow
Assistant Examiner—Mathieu Vargot
Attorney, Agent, or Firm—Armstrong, Westerman, Hattori, McLeland & Naughton

[57] ABSTRACT

A method for improving the internal surface of a gas-barrier, when required heat-shrinkable, multi-layer plastics film laminate in the form of a seamless tube having the innermost layer of olefin resin, the method including applying corona discharge employing at least two pairs of electrodes to the innermost layer from the outside of the tube having a gas sealed therein and pressed to a flat state avoiding the contact of opposed surface areas of innermost olefin resin layer with each other, the two pairs of electrodes being arranged such that one electrode of each pair is in contact with the outermost layer of the tube and the other of the same pair out of contact therewith while one electrode of one pair is kept in contact with the outermost layer of the tube with which one electrode of another pair is kept out of contact on the same side of the tube, so that the wetting tension of the innermost layer surface is increased to at least 35 dyne/cm by the corona discharge treatment.

11 Claims, 4 Drawing Sheets

METHOD FOR IMPROVING THE INTERNAL SURFACE OF SEAMLESS TUBE OF MULTI-LAYER PLASTICS FILM LAMINATE

FIELD OF THE INVENTION

This invention relates to a method for improving the internal surface of a multi-layer plastics film laminate in the form of a seamless tube for packing processed meat or like food, and more particularly to a method for treating the surface of the innermost polyolefin resin layer of a multi-layer plastics film laminate in the form of a seamless tube by subjecting the seamless tube to corona discharge treatment to improve the degree of close contact between the tube and the processed meat or the like to be enclosed therein.

BACKGROUND ART

Heretofore known are a variety of gas-barrier, multi-layer plastics film laminates useful as packaging materials for enveloping processed meat or like food. Among them are seamless tubes of gas-barrier, preferably heat-shrinkable, multi-layer plastics film laminate having a layer of olefin resin for contact with processed meat or the like to be enclosed therein. However, such seamless tubes of multi-layer plastics film laminate with the innermost polyolefin resin layer have drawbacks. Since the olefin resin layer has a poor property of closely contacting food, particularly ham, sausage or like processed meat, a gap is formed between the processed meat and the packaging material on heat-shrink packaging or after a time interval, followed by occurrence of the so-called release of gravy, water or the like from the processed meat into the gap. In that case, bacteria easily proliferate and the proliferation of bacteria renders the processed meat or the like less preservable.

To cope with the problem, various methods have been conventionally carried out which include, for example, applying to the olefin resin layer a substance capable of closely contacting processed meat or the like, forming the innermost layer capable of closely contacting meat, or treating the innermost layer by corona discharge to improve the degree of close contact with processed meat or the like. However, these methods have both advantages and disadvantages and thus remain to be improved.

DISCLOSURE OF THE INVENTION

The present invention has been accomplished to obviate said problem. An object of the invention is to provide a method for treating the surface of the innermost olefin resin layer of a multi-layer plastics film laminate in the form of a seamless tube to improve markedly the degree of close contact between the innermost layer and the processed meat or the like by applying corona discharge uniformly to the innermost layer.

The present invention provides a method for improving the internal surface of a gas-barrier, optionally heat shrinkable, multi-layer plastics film laminate in the form of a seamless tube having the innermost layer of olefin resin, the method comprising applying corona discharge employing at least two pairs of electrodes to the innermost layer from the outside of the tube having a gas sealed therein and pressed to a flat state avoiding the contact of opposed surface areas of innermost olefin resin layer with each other, said two pairs of electrodes being arranged such that one electrode of each pair is in contact with the outermost layer of the tube and the other of the same pair out of contact therewith while one electrode of one pair is kept in contact with the outermost layer of the tube with which one electrode of another pair is kept out of contact on the same side of the tube, so that the wetting tension of the innermost layer surface is increased to at least 35 dyne/cm by the corona discharge treatment.

According to the treating method of the invention, corona discharge is induced over the seamless gas-containing tube of a multi-layer film laminate from the outside of the tube by at least two pairs of electrodes provided in the above-specified arrangement while the tube is positively pressed to a flat state avoiding the mutual contact of opposed surface areas of innermost olefin resin layer, whereby the innermost layer is substantially evenly treated to increase the wet tensile strength of its surface. Reversely if corona discharge is applied from the outside of the tube free of a gas, the wetting tension of the innermost layer surface is not increased.

It remains to be clarified why the olefin resin layer is improved in the ability to attain close contact with processed meat or the like when subjected to corona discharge treatment of the invention. Presumably one cause is the increase in the wetting tension of olefin resin layer surface. Consequently it is desirable to perform corona discharge treatment under such conditions that the surface of innermost layer treated by corona discharge is increased in the wetting tension to at least 35 dyne/cm, preferably at least 37 dyne/cm, more preferably 40 to 50 dyne/cm. The conditions for corona discharge treatment can be suitably determined without specific limitation according to the kind, thickness, feed speed and other factors of the tube to be treated so that the wetting tension of the layer surface is in said range.

At least two pairs of discharge electrodes and counter electrodes (earth electrodes) are used for the corona discharge. It is critical in the invention that one electrode of each pair be disposed in contact with the outermost layer of the tube and the other electrode of the same pair out of contact therewith while one electrode of the preceding pair is out of contact with the surface area of outermost layer with which one electrode of the succeeding pair is in contact. One electrode of each pair to be contacted with the outermost layer of the tube may be either a discharge electrode or a ground electrode provided that if the discharge electrode is arranged in contact with the outermost layer, the ground electrode of the same pair is kept out of contact therewith, and vice versa. The succeeding pair of electrodes are arranged so that the discharge electrode and the ground electrode of the same pair is reversely arranged relative to the preceding pair with the result that the innermost layer of the tube positively pressed is practically uniformly treated over the entire surface thereof.

The gas-containing tube may be positively pressed to flatness sufficient to avoid the mutual contact of opposed innermost layer surface areas by pressing members of insulating materials such as insulating plates disposed in opposite positions on both sides of the tube with a spacing therebetween to interpose the gas-containing tube. Other methods of positively pressing the gas-containing tube than with the pressing members include air-injecting methods and like suitable methods which are not specifically limitative. Among air-injecting methods are methods adapted to inject air along the circumferential periphery of the electrode as by means of an air knife, and methods using an electrode of the pair including air-injecting means such as an air roll having a surface with bores for injection of pressurized air. Optionally the pressing members such as insulating plates are employable in combination with an air-injecting method. Although it is preferred to provide pairs of pressing members in opposed positions on both sides as stated above, pairs of pressing members are not necessarily used, and the shape and the materials of the members and the like are not specifically limited. The electrodes with air-injecting means include those having bores, slits or like suitable air-injecting means capable of injecting pressurized air therethrough. Such air-injecting means may be provided in the desired position, without specific limitation, of suitable electrodes such as roll electrodes, plate-shaped electrodes, bar-shaped electrodes or the like. The air injecting means may be provided in either a discharge electrode or ground electrode. Preferred among these electrodes is a roll electrode with air-injecting means (air roll electrode). Such air roll electrodes are in the form of a roll having a surface with bores, pores, slits or any other suitable means for forcing out pressurized air. When an air roll electrode is used, a membrane of air or a layer of air is formed on the roll surface in passing a web so that the web is permitted to pass without direct contact with the roll (the direct contact is avoidable in use of electrodes with other air-injecting means). The spacing between the electrode with air-injecting means and the surface of outermost layer of the tube, although widely variable depending on the air pressure, the diameter of bores or pores and the like and not specifically limitative, is usually about 0.01 to about 3 mm, preferably about 0.5 to about 1.2 mm.

The spacing between the paired electrodes for corona discharge treatment although not specifically limited is, for example, about 5 mm or less, preferably about 2.0 mm or less. Examples of common electrodes for use herein are roll electrodes, plate-shaped electrodes, bar-shaped electrodes and the like which, however, are not specifically limitative. While as stated above either a discharge electrode or ground electrode may be used as such electrode, roll electrodes are preferred. The spacing between the opposed surface areas of innermost layer of the tube positively pressed during corona discharge treatment is preferably about 5.0 mm or less, more preferably about 1.8 mm or less, most preferably about 1.0 mm or less which, however, are not specifically limitative insofar as the opposed surface areas are not contacted directly with each other.

The tube portion to be positively pressed may be at the site of corona discharge, or before or behind the site thereof and is selectable without specific limitation. The tube may be pressed from one side or both sides of the tube insofar as the tube is held positively pressed during application of corona discharge. For example, the pressing members or the like are not disposed directly at the site of corona discharge and may be discontinuous thereat, provided that the tube is kept pressed at the site thereof. The pressing members are arranged in such opposed positions that the pressing members may be disposed as spaced away from opposed pressing members, but if the opposed pressing members allow the passage of a gas through a spacing formed therebetween, they may be in contact with each other at the remaining portion.

There is no specific limitation on filling a gas into the tube. If corona discharge is continuously applied, a long length of the gas-containing tube may be advanced between two pairs of nip rolls. The gas-containing tube is subjected to the corona discharge treatment of the invention and then is cut to the predetermined length as required to give the desired packaging material. Usually packaging materials are produced by such continuous method. Useful gases are not specifically limited and include air, nitrogen, carbon dioxide gas, inert gas and the like.

The methods of the invention are specifically described below with reference to the drawings schematically showing the preferred embodiments of devices to be used for carrying out the methods of the invention.

DETAILED DISCLOSURE OF THE INVENTION

Figure 1:
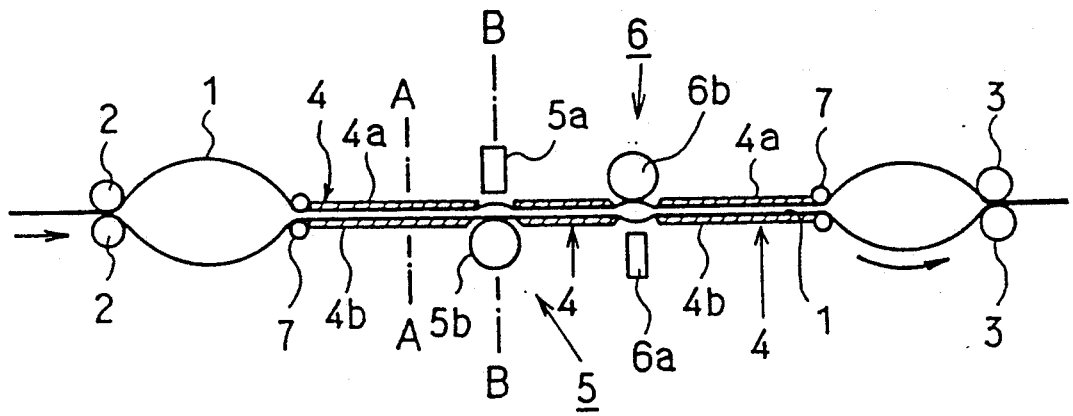
FIG. 1 is a sectional view schematically showing an example of the device for carrying out the method of the present invention.
Figure 2:
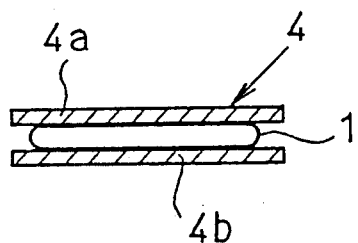
FIG. 2 is a sectional view taken along line A—A of FIG. 1.

Indicated at 1 in FIG. 1 is a gas-barrier, optionally heat-shrinkable, multi-layer plastics film laminate in the form of a seamless tube produced by an inflation method and having the innermost layer formed from olefin resin. The tube 1 having a gas sealed therein by means of pairs of pinch rolls 2, 2 and 3, 3 is continuously advanced in the direction indicated with arrow symbols from leftward to rightward in the view. Designated 4 are pressing means for positively pressing the tube 1. The pressing means 4 consist of two pressing plates 4a, 4b spaced away from and opposed to each other and are preferably made of a fluorine-containing resin or like insulating material. The pressing plates 4a, 4b constituting the pressing means 4 need not be formed from an insulating material in its entirety but are required to have insulating properties at least at their portions close or adjacent to corona discharge means. The tube 1 is pressed and made flat as shown in FIG. 2 by virtue of the interaction between the spacing spanning the pressing plates 4a, 4b and the gas in the tube. Although the pressing plates 4a, 4b are discontinuous at locations beside corona discharge means 5, 6 to increase the effect of corona discharge (see FIG. 3), the tube 1 is slightly inflated at said locations and kept positively pressed by the pressing plates 4a, 4b. While the pressing plates 4a, 4b used for pressing the tube in this way are preferably discontinuous at the locations near the corona discharge means 5, 6, the pressing plates may be disposed in a suitable manner, and one of the opposed insulating members such as the pressing plates 4a, 4b may be dispensed with. Indicated at 7 are guide rolls. The corona discharge means 5 consists of a pair of discharge electrode 5a and ground electrode 5b, and the subsequent corona discharge means 6 consists of a pair of discharge electrode 6a and ground electrode 6b. The discharge means 5, 6 have the discharge electrodes and ground electrodes reversely positioned. In the illustrated embodiment, the discharge electrodes 5a, 6a are out of contact with the outermost layer of the tube and the ground electrodes 5b, 6b in contact therewith.

Figure 3:
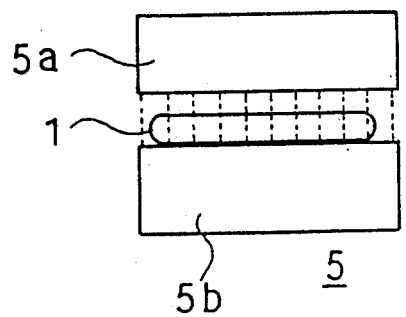
FIG. 3 is a sectional view taken along line B—B of FIG. 1.

Corona discharge is applied from the discharge electrode 5a to the ground electrode 5b as shown with broken lines in FIG. 3, whereby the opposed surface areas of the innermost layer of the tube are subjected to corona discharge treatment. Corona discharge applied by one pair of electrodes tends to treat the innermost layer of the tube only from one side, resulting in uneven treatment of the innermost layer. To obviate this objection, preferably at least two pairs of electrodes are provided in such manner that the two discharge electrodes are arranged in opposed diagonal positions.

Figure 4:
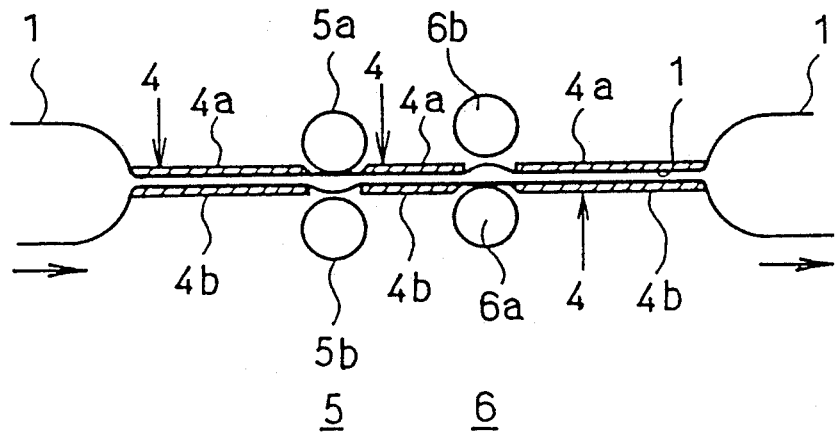
FIG. 4 is a sectional view schematically showing another embodiment for carrying out the method of the present invention.
Figure 5:
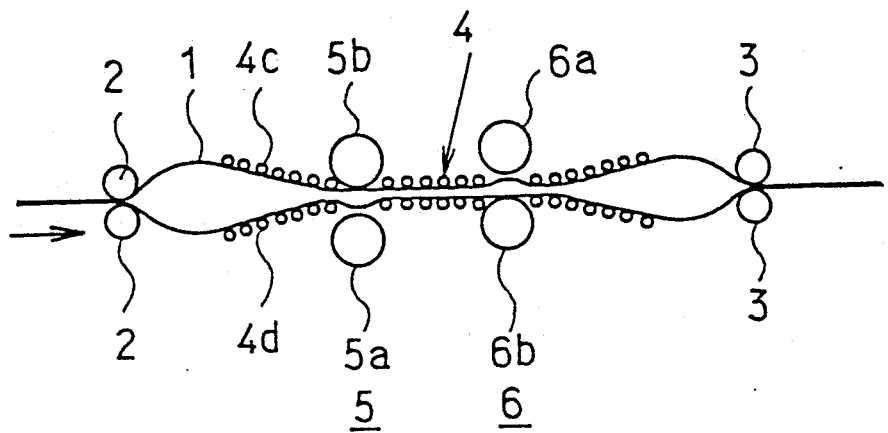
FIG. 5 is a sectional view schematically showing another embodiment for carrying out the method of the invention.

The methods of corona discharge treatment are not specifically limited to the method of the device as shown in FIG. 1 and various methods are employable. For example, electrode rolls may be used for discharge electrodes 5a, 6a, and ground electrodes 5b, 6b as shown in FIG. 4. These electrodes are arranged in the same manner as in FIG. 1 except that the discharge electrodes 5a, 6a are in contact with the outermost layer of the tube and the ground electrodes 5b, 6b out of contact therewith. The surface of these electrode rolls may be coated with rubber, a fluorine-containing resin or the like when so required. Series of rollers 4c, 4d arranged at opposed locations as shown in FIG. 5 may be provided as pressing means 4 instead of the pressing plates 4a, 4b in FIG. 4. In this case, at least the series of rollers adjacent to the corona discharge means 5, 6 are made of insulating materials.

The discharge electrodes shown in FIG. 1 may be in the form of a plate, a bar or the like. The form of electrodes useful herein is suitably selected and the corona discharge device can be any of conventional ones.

Figure 6:
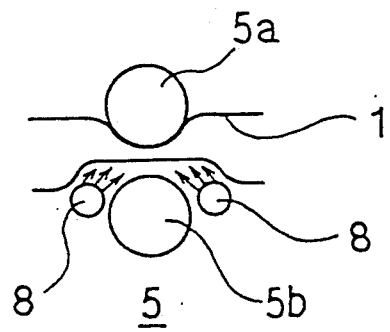
FIG. 6 is a sectional view schematically showing another embodiment for carrying out the method of the invention.

FIG. 6 is a fragmentary view showing by way of example a method of applying corona discharge in which corona discharge is applied while the tube 1 is positively pressed to a flat stare by the pressurized air injected from air pipes 8 provided on either side of a ground electrode 5b. In this embodiment, corona discharge is applied while the electrode 5b is kept out of contact with the outermost layer of the tube. Optionally two types of pressing means, i.e. pressing plates 4 shown as in FIGS. 1 and 4 and the pressing means shown as in FIG. 6, may be used in combination so that the pressing means and the force of injected air act together more advantageously and positively to press the tube to effect corona discharge treatment.

Figure 7:
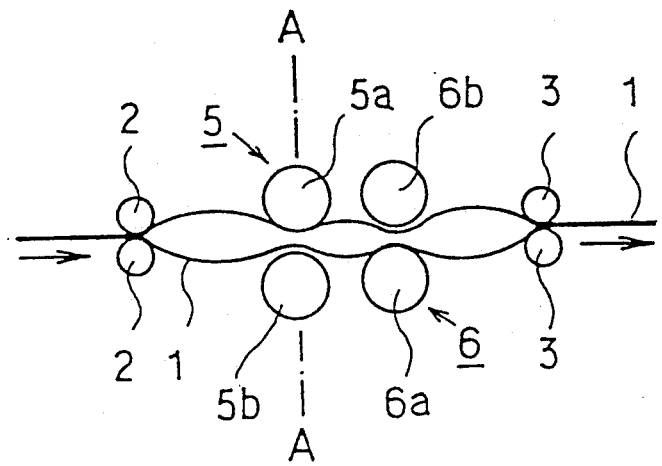
FIG. 7 is a sectional view schematically showing an example of the device having air roll electrodes for carrying out the method of the invention.
Figure 8:
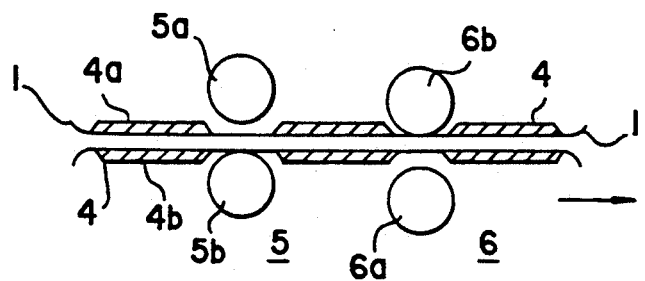
FIG. 8 is a sectional view schematically showing another example of the device having air roll electrodes.

FIGS. 7 and 8 show embodiments wherein one electrode of each pair has air-injecting means. Air roll electrodes are employed for ground electrodes 5b, 6b in FIG. 7 and for discharge electrodes 5a, 6a in FIG. 8. The embodiment of FIG. 7 is adapted to effect corona discharge treatment in the following state without use of the pressing plates 4 shown in FIGS. 1 and 4. Common roll electrodes used as discharge electrodes 5a, 6a are kept in contact with the outermost layer of the tube 1 while the tube 1 is pressed to a flat state by the air injected from the air roll electrodes as ground electrodes 5b, 6b which are kept out of contact with the outermost layer of the tube. FIG. 8 shows a more preferred device for performing corona discharge treatment of the tube 1 which is pressed to a flat state with pressing means 4 in combination with air roll electrodes of the pairs. The device of FIG. 8 corresponds to the one in which the air roll electrodes used for discharge electrodes 5a, 6a in the device of FIG. 4 are kept out of contact with the outermost layer of the tube and the ground electrodes 5b, 6b are retained in contact therewith. In the illustrated device, the air roll electrodes, of the preceding pair of electrodes 5 and of the succeeding pair of electrodes 6, are diagonally placed without contact with the outermost layer of the tube, while the common type of other electrodes are in contact therewith, so that corona-discharge is applied in opposite directions by the preceding pair of electrodes 5 and the succeeding pair of electrodes 6.

Figure 9:
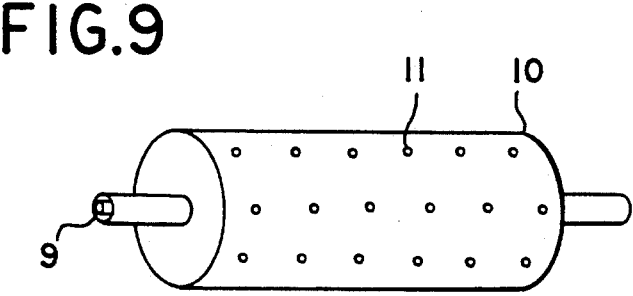
FIG. 9 is a perspective view schematically showing an example of air roll electrodes.
Figure 10A:
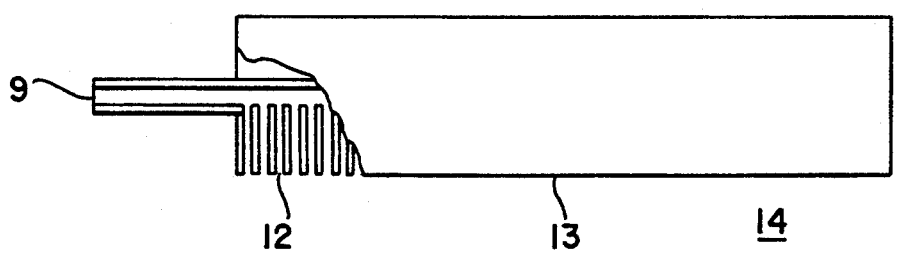
FIG. 10 A and B show a front view and a side view showing an example of the electrode having gas-injecting means.
Figure 10B:
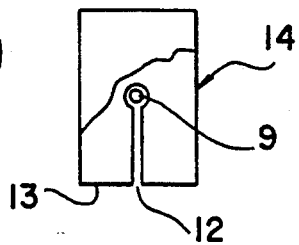

A preferred example of air roll electrodes is depicted in FIG. 9. In the illustrated electrode, pressurized air is introduced from an air supply means 9 into a roll 10 and is forced out through bores 11 formed on the surface of the roll 10. The tube is pressed to a flat state by the injection force of pressurized air. A layer of air or the like having a suitable thickness is formed between the surface of the roll 10 and the outermost layer of the tube, whereby no direct contact occurs therebetween. Usable instead of such air roll electrode is, for example, a plate-shaped electrode having means in the form of a slit for injecting pressurized air on one side or both sides thereof (not shown) or a bar-shaped electrode having means in the form of a continuous series of bores for injecting pressurized air. Optionally a plate-shaped electrode having means in the form of a slit for injecting pressurized air on one side or both sides of the discharge means (not shown) may be employed instead of the electrode having air-injecting means used in the embodiment shown in FIG. 8, or a bar-shaped electrode having means in the form of a continuous series of bores for injecting pressurized air in discharge means may be provided as shown in FIG. 10. Various kinds of electrodes having air-injecting means are usable as described above. The electrode shown in FIG. 10 is such that pressurized air is introduced from an air supply member 9 into the electrode and is injected through the continuous series of bores 12 formed in a discharge electrode (or ground electrode). With this embodiment, a layer of air or the like having a suitable thickness is formed between the outermost layer of the tube and the surface of the electrode by the injection force of pressurized air so that the electrode surface is kept out of direct contact with the outermost layer of the tube. In the embodiment, discharge means 13 consists of the entire surface of the underside of the electrode 14 shown in FIG. 10. Even if the continuously arranged bores 12 are partly formed in the discharge means, the discharge treatment would be scarcely affected.

Figure 11:
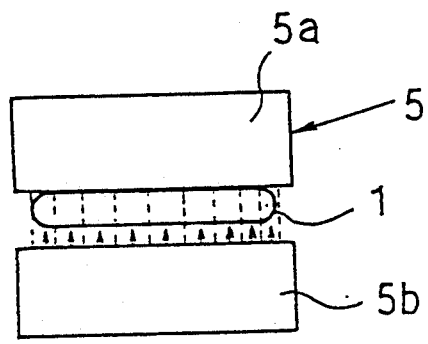
FIG. 11 is a sectional view taken along line A—A of FIG. 7.

Corona discharge is applied from a discharge electrode to a ground electrode as shown, for example, with broken lines in FIG. 11. For further example, with the embodiments of FIGS. 7 and 8, corona discharge is applied in reverse directions by the two pairs of electrodes 5, 6 for corona discharge treatment, whereby the opposed surface areas of the innermost layer of the tube 1 are subjected to corona-discharge treatment. The arrow symbols in FIG. 11 represent air.

If only one pair of electrodes is used for corona discharge treatment, the corona discharge tends to treat the tube only from one side, resulting in uneven treatment of opposed surface areas of innermost layer of the tube. Preferably used for overcoming the problem are at least two pair of electrodes for corona discharge treatment which are disposed such that the discharge electrodes are positioned as diagonally opposed to each other on either side to apply corona discharge in reverse directions.

The methods of corona discharge treatment are not limited to the methods of the devices as described above and can be variously carried out. Various means for pressing the tube to flatness may be used in combination.

Figure 12:
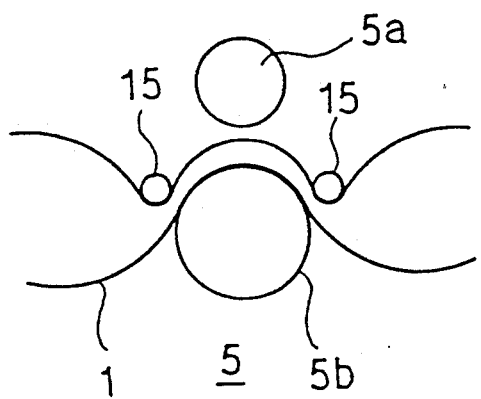
FIG. 12 is a fragmentary view schematically showing an example of the device having air roll electrodes for carrying out the method of the invention.

For example, pressure may be applied by the method as shown in FIG. 12. FIG. 12 indicates only another embodiment of a pair of electrodes 5 for corona discharge treatment, and thus omits the other parts of the intended device. The embodiment of FIG. 12 is adapted to press the gas-containing tube by the action of an air roll electrode 5a while the tube is being guided along a roll electrode 5b by guide rolls 15, 15. In this embodiment, the air roll electrode is employed as the discharge one although either a roll electrode or an air roll electrode is usable.

When the tube folded on both sides by being pressed tends not to be fully treated at the folded portions, a specified number of pairs of electrodes for corona discharge treatment may be provided as in another direction.

The drawings show the methods in which the corona discharge treatment is continuously performed while the tube is being advanced in a lateral direction in the view. Yet the treatment of the invention can be done while the tube is being moved forward, not to mention, in any desired direction, for example, from upward to downward or from downward to upward.

The multi-layer plastics tube of the invention has a layer of olefin resin at the internal surface to be contacted with processed meat or the like. Examples of useful olefin resins are homopolymers of olefins, copolymers thereof, copolymers of the olefin and other monomers copolymerizable therewith such as other vinyl monomers, modified polymers thereof and the like. Specific examples of such resins are polyethylene having a low to high density, polypropylene, polybutene, copolymers thereof, ionomer resins, ethylene-acrylic acid copolymers, ethylene-vinyl acetate copolymers, modified olefin resins, etc. Typical examples of the modified olefin resins include modified polymers prepared by copolymerizing, e.g. graft copolymerizing, the homopolymer of the olefin or copolymer thereof with maleic acid, fumaric acid or like unsaturated carboxylic acid, or a derivative thereof such as the anhydride, ester or metal salt thereof or the like. The modified polymers may be in the form of a mixture with other resins such as other olefin resins. Preferred examples of the olefin resins are low-density polyethylene, linear low-density polyethylene, ionomer resins, modified olefin resins, ethylene-vinyl acetate copolymers, etc. The olefin resins are usable singly or at least two of them can be used in mixture.

The multi-layer tube of the invention is composed of from 2 to 5 or more resin layers formed according to the required degree of properties such as strength or gas barrier property. Included among olefin resins for forming a layer for contact with food or the like to be enclosed therein are those having a poor gas-barrier property against oxygen or the like. When such olefin resin is used, at least one resin layer of the film laminate is formed from another resin having a gas barrier property. Exemplary of the resins having a gas barrier property are nylon 6, nylon 6,6, copolymers thereof and like polyamide resins (nylon), aromatic polyamide resins, polyacrylonitrile resins, polyvinylidene chloride resins, ethylene-vinyl alcohol copolymers, etc. Polyester resins are among those having a moderate degree of gas barrier property compared with said resins.

A multi-layer tube according to a preferred embodiment of the invention is composed of an olefin resin film as the innermost layer for contact with the food or the like to be enclosed therein and a base film having high impact resistance and high abrasion resistance as the outermost layer, with or without an intermediate film formed therebetween. A preferred example of such film laminate is a three-layer laminate consisting of the outermost layer (base film), intermediate adhesive layer and innermost olefin resin layer. Preferred resins for the base film having said properties include nylon 6, nylon 6,6, copolymers thereof and like polyamide resins, polyester resins, polyacrylonitrile resins, etc. Of these resins, nylon 6, nylon 6,6, copolymers thereof and like polyamide resins are especially preferred. When the base layer has a fully satisfactory gas barrier property and has adhesion to the innermost olefin resin layer, an intermediate layer need not be formed therebetween. On the other hand, when the base and innermost layers have little or no adhesion to each other, an intermediate layer with adhesion to both of these layers needs to be present therebetween. When the base layer lacks a gas barrier property or is required to have a higher level of gas barrier property, the gas barrier property requirement can be met by forming an intermediate layer having the desired gas barrier property. The intermediate layer may be of one ply or two or more ply structure. A wide range of resins can be used for forming the intermediate layer. Examples thereof are modified olefin resins, ionomer resins, ethylene-ethyl acrylate resins, ethylene-acrylic acid resins, ethylene-vinyl alcohol copolymers, aromatic polyamide resins, ethylene-methacrylic acid copolymers, mixtures thereof, etc. Resins for the intermediate layer are selected from those having a high adhesion to adjoining resin layers. When the intermediate layer is required to have a gas barrier property and strength, useful resins are selected from those having suitable properties meeting the requirement. For example, when nylon 6, nylon 6,6 or like polyamide resin having a good gas barrier property and high strength is used for the outermost base layer, it is possible to form an intermediate layer from a modified olefin resin, ionomer resin, ethylene vinyl alcohol copolymer or the like having a high adhesion to the innermost olefin resin layer and the polyamide resin layer. Among them, ethylene-vinyl alcohol copolymer resin with a gas barrier property and odor-preserving property, or modified olefin resin is preferably used for an intermediate layer.

The two or more ply intermediate layer can improve the gas barrier property of the laminate tube or can give the laminate tube various characteristics required for a particular application.

Various combinations of resins are available for forming the layers constituting the laminate tube of the invention. Preferred combinations are given below in which the resins are represented for layers in the order of outermost layer/1 or more ply intermediate layer/innermost layer. Alphabet symbols are intended to designate the following resins in the combinations exemplified below.

A: Polyamide resin
B: Modified olefin resin
C: Olefin resin
D: Gas barrier resin other than polyamide resins

---

A/B/C, A/D/C, B/A/B, B/D/B, A/D/B, B/A/B/C, B/D/B/C,
A/D/B/C, A/B/D/B, B/D/A/B, B/A/D/B, C/B/D/B/C,
A/B/D/B/C, B/A/D/B/C, B/D/A/B/C, B/$D_1$/$D_2$/B/C,
D/A/B/C, A/B/$C_1$/$C_2$, A/$B_1$/$B_2$

---

The symbols $B_1$ and $B_2$ used above denote different modified olefin resins, $C_1$ and $C_2$ different olefin resins, and $D_1$ and $D_2$ different gas barrier resins.

Also usable are a combination in which B is replaced by an ionomer resin, and a combination in which the resin for the outermost layer is replaced by vinylidene chloride resin (D) or by the resin (D) coated. Ethylene-vinyl alcohol copolymers (with a gas barrier property) are also usable as the resin (D). As stated above, the tube of the invention has essentially a gas barrier property, preferably a heat shrinkability or may be, of course, an unstretched type having no heat shrinkability.

Objects to be packed with the tube of the invention as the packaging material include, for example, processed meat such as ham, sausage, bacon and the like, processed fish flesh, semicylindrically shaped or tubularly shaped boiled fish paste, etc. The packaging material for packing such products is provided, for example, in the form of casing, bag or the like. A long seamless tube subjected to corona discharge treatment is cut to suitable length and is provided as it is for use as the desired packaging material in the form of casing, bag or the like.

According to the invention, the olefin resin layer for contact with the food or the like to be packed may act as a heat sealant layer depending on the form of packaging material.

If the tube of the invention causes the so-called blocking phenomenon due to the corona discharge treatment and becomes difficult to open, a preventive method may be employed as by spreading starch or like blocking inhibitor over the internal surface of the tube, when so required. The blocking inhibitor may be applied, after corona discharge treatment, onto the internal surface of the gas-containing tube being advanced in a direction from upward to downward or from downward to upward to which, not to mention, the method is not specifically limitative.

Given below are Examples illustrating the present invention.

EXAMPLE 1

A gas-barrier, heat-shrinkable, 3-layer film laminate was produced in the form of a tube by co-extrusion, through an annular die, of a copolymer of nylon 6 and nylon 6,6 for a base layer providing the outer surface of the laminate, a modified olefin resin containing a modified copolymer prepared by graft copolymerization of a linear low-density polyethylene with maleic anhydride for an intermediate adhesive layer and a linear low-density polyethylene for an innermost layer, employing an inflation method; and biaxially stretching the molded tube. The obtained tube had a percent heat-shrinkage of about 20% as measured in longitudinal and lateral directions at a temperature of 80° C. (hot water) for 30 seconds. In this way, two tube specimens were prepared. Specimen No. 1 consisted of three layers each 20, 5 and 20 μm in thickness in the order of outer to inner layers and had a width of 160 mm when flat and Specimen No. 2 was composed of three layers of 25, 5 and 25 μm in thickness respectively in the order of the tube surface downward and had a width of 100 mm in a flat state.

The obtained tube was subjected to corona discharge treatment by applying corona discharge from discharge electrode rolls 5a, 6a to the tube being fed at a rate of 15 m/min with use of the corona discharge treatment device as shown in FIG. 4. For the treatment, a spacing of 2.5 mm was set between the discharge electrode roll (coated with rubber and having a 420 mm length) and the ground electrode roll (made of metal and having a 420 mm length). Before the treatment, air was introduced into the tube and sealed with pinch rolls 2,2 and 3,3 and the gas-containing tube was pressed into a flat state with an insulator 4. The tube being treated was substantially flat with a spacing of about 1.5 mm existing between the opposed areas of internal tube surface not contacted with each other. The electrodes 5b, 6b were disposed at a distance of about 1.0 mm away from the outermost layer of the tube. Cylindrical containers containing corn starch powder (not shown), 97 mm in diameter for Specimen No. 1 and 59 mm in diameter for Specimen No. 2, and having a perforated bottom were inserted into the specimens and the corn starch powder was scattered over the internal tube surface from the container.

The obtained tubes, Specimens Nos. 1 and 2, were each cut to a 40 cm length to provide casings for processed meat. Ham and sausage were packed in deaeration with Specimens Nos. 1 and 2, respectively, which were then hermetically sealed at both ends with metallic ring clips. The packed products were heated at 80° C. for sterilization for 2 hours (or at 100° C. for 1 hour). After cooling, the internal surface of the tube was found to have closely contacted the processed meat. The processed meat was kept satisfactorily packed because of the heat shrinkage of the tube. Moreover, the tubes were easily opened in packing the processed meat and no blocking was caused.

Corona discharge treatment was also performed with the device of FIG. 4 in the same manner as above except that the discharge electrodes were spaced away from the outer surface of the tube (with a spacing of about 1.0 mm between the electrodes 5a, 6a and the outermost layer of the tube) while the earth electrodes were contacted with the outermost layer. This test gave substantially the same results as above.

Table 1 below shows the results.

Table 1 indicates the results provided by testing a seamless tube untreated by corona discharge as a control as well as the results of the tubes prepared in Example 1 according to the present invention and containing the processed meat.

TABLE 1

|  | Present No. 1 | Invention No. 2 | Control No. 1 |
|---|---|---|---|
| Wetting tension of internal tube surface (dyne/cm) | 42 | 41 | 31 |
| Degree of close contact with processed meat (*2) | A | A | C |
| Release of water (*3) | None | None | Gravy found |
| Preservability | Good | Good | Poor |

The preservability was rated as good if no gap was formed between the casing and the processed meat and as poor if it produced a gap therebetween.

EXAMPLE 2

The same seamless tubes, Specimens No. 1 and No. 2, as in Example 1 were each subjected to corona discharge treatment by applying corona discharge from the discharge electrode rolls 5a, 6a to the tube being fed at a rate of 15 m/min with use of the corona discharge treatment device as illustrated in FIG. 8. For the treatment, roll electrodes (coated with rubber and having a length of 420 mm) were used as the discharge electrodes and air roll electrodes (made of metal, formed at its surface with a specific number of pores 2 mm in diameter for injecting air, and having a length of 420 mm) were used as the earth electrodes 5b, 6b. A spacing of 2.0 mm was set between the discharge and earth electrodes.

Before the treatment, the tube was charged with air and sealed with pinch rolls 2,2 and 3,3 and pressed into a flat state with the roll electrodes 5a, 6a and air roll electrodes 5b, 6b. The pressing means 4 used were the same as in Example 1. In this way, the gas-containing tube was made nearly flat to maintain a spacing of about 0.89 mm between the opposed internal surface areas not contacted with each other. The spacing between the air roll electrodes and the outer surface of the tube was about 1.0 mm. Corn starch powder was scattered over the internal tube surface of Specimens No. 1 and No. 2 by carrying out the same procedure as in Example 1. The obtained tubes, Specimens Nos. 1 and 2, were each cut to a 40 cm length to provide casings for processed meat. Ham and sausage were filled in deaeration into Specimens Nos. 1 and 2, which were then hermetically sealed at both ends with metallic ring clips. The packed products were heated at 80° C. for sterilization for 2 hours (or at 100° C. for 1 hour). After cooling, the internal tube surface was found to have closely contacted the processed meat. The processed meat was kept satisfactorily packed due to the heat shrinkage of the tube. In addition, the tubes were easily opened in packing the processed meat and no blocking was caused. Table 2 below shows the results.

Table 2 shows the results given by testing a seamless tube untreated by corona discharge as a control as well as the results of the specimens produced according to the invention in Example 2 and containing the processed meat.

TABLE 2

|  | Present No. 1 | Invention No. 2 | Control No. 1 |
|---|---|---|---|
| Wetting tension of internal tube surface (dyne/cm) | 42 | 41 | 31 |
| Degree of close contact with processed meat (*2) | A | A | C |
| Release of water (*3) | None | None | Gravy found |
| Preservability | Good | Good | Poor |

We claim:

1. A method for improving the internal surface of a gas-barrier, optionally heat-shrinkable, multi-layer plastics film laminate in the form of a seamless tube having an innermost layer of olefin resin, the method comprising applying corona discharge employing at least two pairs of electrodes to the innermost layer from the outside of the tube having a gas sealed therein and pressed to a flat state avoiding the contact of opposed surface area of the innermost olefin resin layer with each other, said two pairs of electrodes being arranged such that one electrode of each pair is in contact with the outermost layer of the tube and the other of the same pair is out of contact therewith, the electrodes out of contact with the tube being diagonally opposed, so that the wetting tension of the innermost layer surface is increased to at least 35 dyne/cm by the corona discharge treatment.

2. A method according to claim 1 wherein the tube is pressed to a flat sate by being passed through between pressing members disposed in opposed positions.

3. A method according to claim 1 wherein the multi-layer plastics film laminate is heat-shrinkabe.

4. A method according to claim 1 wherein the tube containing a gas therein is pressed to a flat state by being passed through between pressing members disposed in opposed positions and also by air-injecting means.

5. A method according to claim 1 wherein the corona discharge treatment is performed while the tube is pressed to a flat state by air injected from air-injecting means of electrodes kept out of contact with the outermost layer of the tube.

6. A method according to claim 1 wherein the corona discharge is applied while the gas-containing tube is pressed to a flat state by being passed through between pressing members disposed in opposed positions and is also pressed by air injected from air-injecting means of electrodes kept out of contact with the outermost layer of the tube.

7. A method according to claim 5 or 6 wherein the electrodes having air-injecting means are air roll electrodes.

8. A method according to any one of claims 1 to 6 wherein the spacing between the opposed internal surface areas of the tube during the corona discharge treatment is 5 mm or less.

9. A method according to claim 8 wherein the spacing between the opposed internal surface areas of the tube during the corona discharge treatment is 1.8 mm or less.

10. A method according to claim 1 wherein the wetting tension of the innermost layer surface is increased to at least 37 dyne/cm by the corona discharge treatment.

11. A method according to claim 10 wherein the wetting tension of the innermost layer surface is increased to 40 to 50 dyne/cm by the corona discharge treatment.

* * * * *